United States Patent [19]

Gueissaz

[11] 4,370,172
[45] Jan. 25, 1983

[54] CONTROLLED VORTEX PUMP FEED FOR SUPPLYING CELLULOSE-CONTAINING MATERIAL TO REACTION VESSEL

[75] Inventor: Charles Gueissaz, Neuilly-sur-Seine, France

[73] Assignee: Compagnie de Construction Mecanique Sulzer, French Societe Anonyme, Paris, France

[21] Appl. No.: 244,728

[22] Filed: Mar. 17, 1981

[51] Int. Cl.³ .............................................. C13K 1/02
[52] U.S. Cl. ......................................... 127/1; 127/37; 422/110; 432/112
[58] Field of Search ...................... 127/1, 37; 422/110, 422/112

[56] References Cited
U.S. PATENT DOCUMENTS

| | | | |
|---|---|---|---|
| 1,670,727 | 5/1928 | Kocher | 127/1 |
| 2,108,567 | 2/1938 | Scholler | 127/1 |
| 2,681,871 | 6/1954 | Wallace | 127/1 |
| 2,739,086 | 3/1956 | Wallace | 127/1 |
| 3,523,911 | 8/1970 | Funk | 127/1 X |
| 4,023,982 | 5/1977 | Knauth | 127/1 |
| 4,072,538 | 2/1978 | Fahn | 127/1 X |
| 4,279,663 | 7/1981 | Burroughs | 127/1 |

Primary Examiner—Sidney Marantz
Attorney, Agent, or Firm—Michael J. Striker

[57] ABSTRACT

Method and apparatus for feeding vegetable material into a reaction vessel under pressure to subject the vegetable material to a reaction such as cooking or hydrolysis. The vegetable material is shredded and impregnated with a treating liquid. The resulting liquid-solid mixture is fed by a vortex pump to the reaction vessel. Rate of flow to the reaction vessel is controlled by a flow meter and a variable-speed motor driving the vortex pump.

9 Claims, 2 Drawing Figures

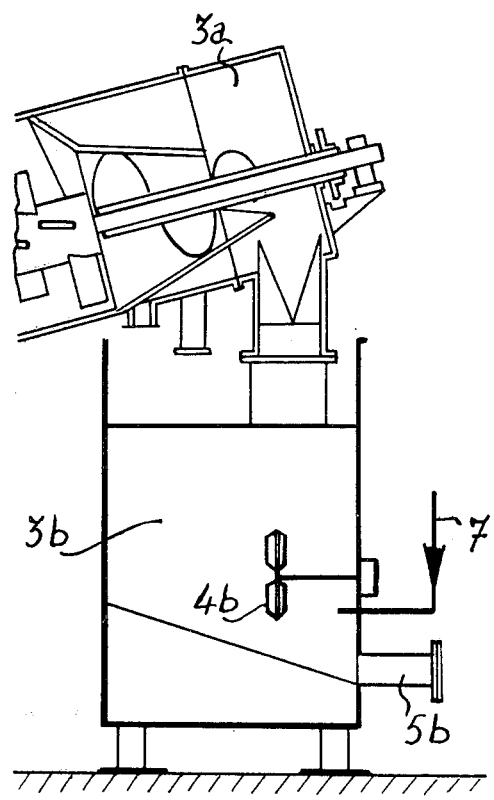
Fig:2

CONTROLLED VORTEX PUMP FEED FOR SUPPLYING CELLULOSE-CONTAINING MATERIAL TO REACTION VESSEL

This invention relates to a method and installation for supplying treatment enclosures with vegetable matter to be cooked or subjected to a reaction under pressure within said enclosures. Both the method and the installation are primarily intended to be employed for supplying treatment enclosures in which annual plants (such as wheat straw, rice straw, bagasse, reeds, etc.) are cooked in a lye for the production of cellulose. However, the method and installation are also intended to permit the supply of treatment enclosures in which plants of the type mentioned above are subjected to hydrolysis in order to extract pentosans.

Processing operations of this type are usually carried out under pressures which can attain 10 to 12 bar. They can be performed either continuously or non-continuously on the batch principle.

Batch-type operation is clearly less advantageous than continuous processing, especially from an economic standpoint. It is in fact for this reason that this type of operation is adopted only for relatively small-scale production and for products which are difficult to process such as linters, hemp, and so on.

In spite of their economic advantages, installations employed for continuous operation are subject to a number of drawbacks, especially by reason of the fact that the materials to be processed have to be fed into a treatment chamber which is in turn at a relatively high pressure.

As a general rule, materials to be processed are introduced in the dry state without preliminary impregnation. The feed device can consist of a chambered rotary valve, a slide-valve lock-chamber or else a tapered screw, the action of which has the effect of forming a buffer of material for withstanding the pressure difference between the interior and the exterior. All these devices are both complex and costly, however, since they have to be so designed as to be capable of withstanding relatively large pressure and temperature differences. Moreover, these systems are subject to very rapid wear by reason of the fact that, in spite of preliminary cleaning, the vegetable matter to be introduced contains silica dust particles which are incorporated in the fibers. This accordingly entails the need to provide an anti-abrasion treatment for the wearing parts. However, this type of treatment is very costly and frequent replacement of parts still remains necessary in spite of the treatment and of any other precautions which may be taken.

A point which is also worthy of note is that screw-type feed devices are subject to the potential danger of accidental expansions of steam in the upstream direction in the event of deficient supply resulting from disappearance of the buffer of material which forms a plug and withstands the pressure difference. A further point is that screw-type feed systems operate correctly only with dry materials; it is therefore impossible to preimpregnate the products, whereas this operation permits an appreciable improvement in the quality of cooking.

In order to overcome the disadvantages of devices for dry-state introduction of materials to be processed, it has already been proposed to carry out this introduction in liquid form as disclosed, for example, in French patent No. 1,226,093. To this end, provision is made for preliminary dilution of the materials to be fed into the treatment enclosure in order to produce a pumpable liquid mixture. By means of a centrifugal pump, this mixture is discharged into the corresponding treatment enclosure.

However, the device thus provided is not suitable for the introduction of annual plants or the like. In fact, by reason of the very nature of these plants, they have a tendency to float when it is endeavored to carry out dilution of such plants in order to produce a pumpable mixture. It is in fact for this reason that dilution can be achieved only with considerable difficulty. Moreover, insofar as it has been possible in practice to obtain a liquid mixture from plants of the type mentioned above, this mixture cannot readily be drawn up by a centrifugal pump. Since they are supplied in the form of fibers or stems having a certain length, annual plants have a tendency to choke a centrifugal pump and thus to prevent further operation of the pump.

Moreover, in order to permit operation of the devices for introduction of plants in the form of a liquid mixture, it is necessary above all to ensure that the discharge pressure is always higher than the pressure which prevails within the treatment enclosure, thereby ensuring a continuous flow of liquid-solid mixture within the discharge pipe. Should this condition not be satisfied, the introduction of material cannot take place and may even give rise to backward flow of materials contained within the discharge pipe or even materials which may already have been fed into the treatment enclosure, with all the disadvantages which this would entail.

It is an acknowledged fact that, in present-day devices of the type described in French patent No. 1,226,093, no provision is made for any control or safety system which is capable of constituting a valve of the "non-return" type for ensuring that a flow of the liquid-solid mixture towards the treatment enclosure takes place under all circumstances in spite of any difficulties and irregularities of flow and of introduction which may arise from the special nature of products being conveyed. In consequence, in the device described in the cited patent, the flow of materials and subsequent introduction in the treatment enclosure are liable to be disturbed and may even fail to take place in some instances. Moreover, a backward return of discharged materials may take place under the action of the pressure which prevails within the treatment enclosure.

For this reason, the aim of the present invention is to provide a method and an installation for overcoming the disadvantages of the various systems of the prior art as recalled in the foregoing. To this end, the invention proposes to carry out the introduction of vegetable matter in liquid form but also to make provision for a certain number of special means and arrangements for obtaining wholly satisfactory results.

The distinctive feature of the method according to the invention lies in the fact that, in addition to or in conjunction with the operation involving dilution of the vegetable matter to be introduced, said vegetable matter is subjected to a high degree of impregnation with the liquid in which the treatment is to take place. Discharge of the mixture thus obtained is then carried out by means of a delivery pump of the Vortex type which is capable of conveying a liquid-solid mixture. Said delivery pump is driven at a variable speed by means of a control device operated in dependence on a flow detector branched on the pipe which extends from said pump in order to maintain a constant rate of flow within said pipe.

By virtue of the arrangement thus contemplated, a constant rate of flow towards the treatment chamber is effectively ensured, even if certain irregularities take place in the downstream direction. In fact, in the event of a reduction in the intended flow rate at which the flow detector is set, the control device ensures acceleration of the pump speed in order to restore the flow rate to its normal value. In consequence, this system plays the part of a kind of non-return valve which prevents any danger of a backward return of discharged substances.

In regard to the installation according to the invention, this installation essentially comprises in combination:

an apparatus for a high degree of impregnation of the corresponding materials with the liquid in which the intended treatment is to be performed as well as a dilution apparatus in the event that the impregnation apparatus does not also perform this function;

a pump of the Vortex type or any other suitable type which is capable of conveying the liquid-solid mixture obtained as a result of dilution of the corresponding materials;

a variable-speed motor for driving said pump;

a device for controlling the speed variation of said motor, said device being operated in dependence on a flow detector branched on the pipe which extends from the delivery pump, the function of said detector being to maintain the rate of flow within said pipe at a constant value.

However, the different properties and advantages of this installation and of the corresponding method will become apparent from the following description, reference being given to the accompanying drawings.

BRIEF DESCRIPTION OF THE DRAWINGS

FIG. 2 is a partial view of an alternative embodiment.

Figure 1:
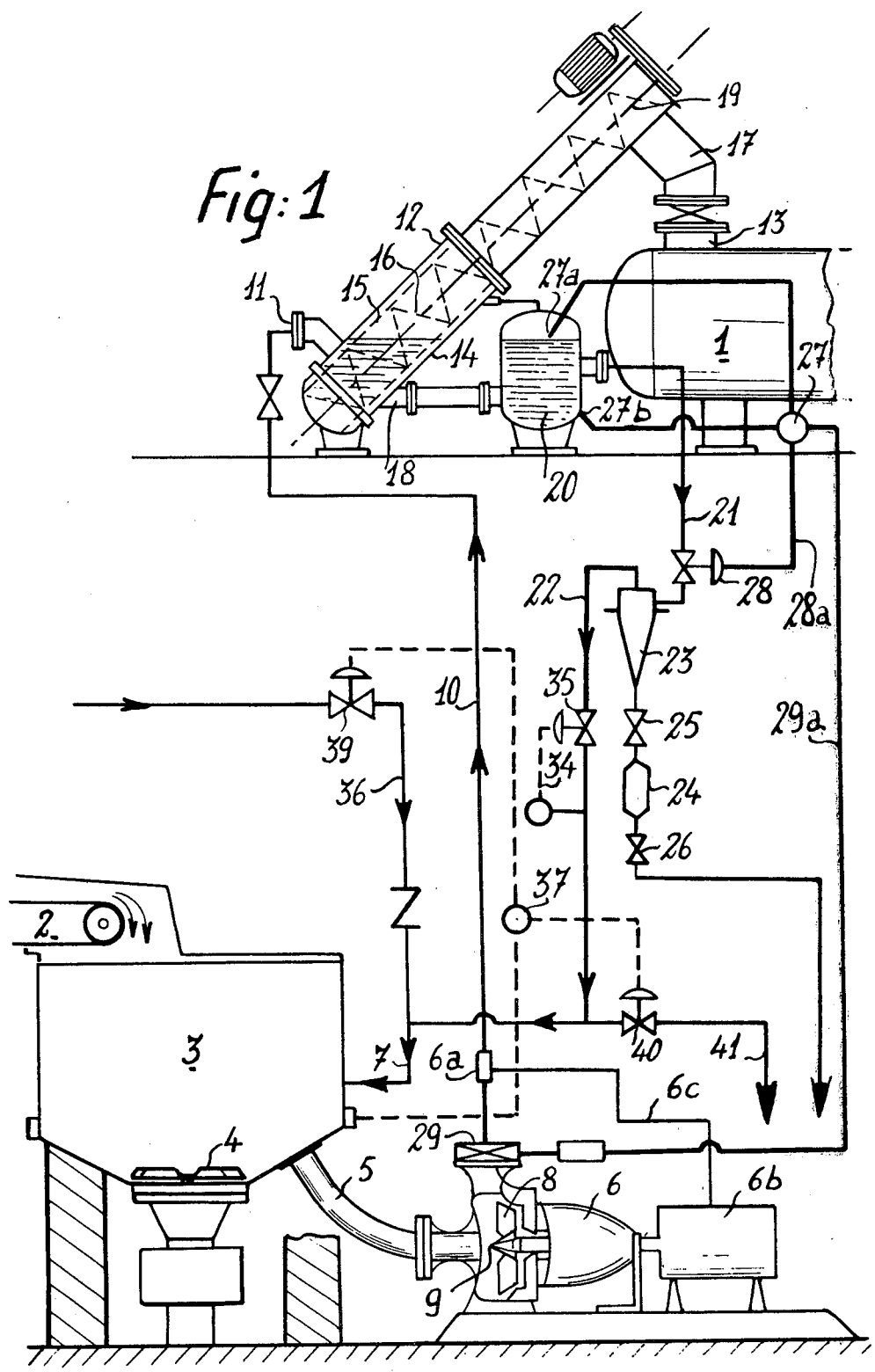
FIG. 1 is a diagrammatic view of the complete feed installation in accordance with the invention.

The installation in accordance with the invention is intended to effect the supply of a treatment enclosure 1 or a series of treatment enclosures in order to carry out within these latter a treatment under pressure of vegetable matter such as, for example, cooking of annual plants in a lye for the production of cellulose, or else hydrolysis of annual plants for extraction of pentosans.

The installation shown in FIG. 1 comprises in the first place an apparatus for carrying out at the same time both pre-impregnation and dilution of the corresponding vegetable materials with the liquid in which the intended treatment is to take place; in the case of cooking for the production of cellulose, said liquid consists of a lye. This apparatus is designated in the accompanying drawings by the general reference numeral 3.

The apparatus under consideration is of the type which is generally referred-to as a pulper. This apparatus comprises a tank containing a bath of treatment liquid. A rotor 4 mounted at the bottom of the tank is provided with grinding fins (not shown) for separating the fibers from the vegetable materials discharged into the tank as well as for shredding and cutting these latter into fragments of small length. Effective impregnation of the fibers of these materials with the treatment liquid is therefore obtained. However, this impregnation is also accompanied by dilution of said fibers in the bath of corresponding liquid in order to produce a liquid-solid mixture which can be pumped.

In this connection, it is of interest to note that dilution takes place under perfect conditions in this case, even if the materials to be processed are annual plants of the type mentioned earlier. In fact, since these materials are subjected to a high degree of impregnation with the treatment liquid, dilution of the materials does not give rise to any problem despite the fact that they would normally have had a tendency to float.

The liquid mixture thus obtained is discharged from the tank of the apparatus 3 through an outlet pipe 5. Said pipe is in fact connected to a pump of the Vortex type which is designated by the general reference numeral 6 and will hereinafter be described in greater detail.

A pipe 7 for the admission of treatment liquid opens into the pulper 3. As will be explained hereinafter, water may be added to said liquid if necessary. This admission of liquid is intended to carry out dilution of vegetable matter in the treatment liquid to a concentration of approximately 5–6% of dry substances in order to obtain a liquid mixture which can be pumped by the Vortex-type pump 6. The body of said pump has a large flow passage providing a uniform flow without any interference. The pump is provided with an open impeller 8 having a body 9 of streamlined shape and the design is such that there is no reduced-pressure zone behind said impeller.

By reason of its design concept and especially the fact that, in a Vortex pump, the indrawn liquid is not caused to flow through the rotor (in contrast to a centrifugal pump), the pump 6 is consequently capable of pumping the liquid-solid mixture contained in the pulper 3. Said pump then pressurizes the mixture to a value of the order of 5 to 8 bar and discharges it into a pipe 10. In fact, the pump 6 has the double function of conveying the corresponding product and of overcoming the pressure which prevails within the treatment enclosure.

As mentioned earlier, the pressure of the pumped liquid mixture must be higher than the pressure which prevails within the treatment enclosure, with the result that a flow must always exist within the discharge pipe 10. In order to obtain this result, the pump 6 is driven by a motor 6b at a variable speed and the speed of this latter is adjusted so as to maintain the discharge flow rate at a constant value in respect of a given value of production within the treatment enclosure.

To this end, the flow rate within the discharge pipe 10 is controlled by a flowmeter 6a. This flowmeter is connected in an electric circuit 6c which is in turn connected to the motor 6b so as to constitute a control device for varying the speed of said motor as a function of the flow rate.

Thus if a reduction in the rate of flow within the pipe 10 occurs for any reason such as, for example, irregularities in the downstream flow, said control device initiates an acceleration of the pump speed in order to restore the rate of flow to the pre-established value. This system therefore makes it possible to ensure with complete reliability that a flow always exists in the direction of the treatment enclosure to be supplied in spite of the pressure prevailing within this latter and any irregularities of flow which may occur on the downstream side. It will readily be apparent that this system consequently also performs the function of a virtual nonreturn valve which prevents any possibility of backward return of discharged materials (or of materials which have already been fed into the enclosure) under the action of the pressure which prevails within said enclosure.

When the installation in accordance with the invention is put into service, it is only necessary to set the flowmeter 6a at a reference value for the desired rate of flow within the discharge pipe 10, the value of said flow rate being determined as a function of the desired value of hourly production within the treatment enclosure. In regard to the pressure within the treatment enclosure, this pressure is adjusted and maintained constant by opening or closing the injection of heating steam into said enclosure.

The discharge pipe 10 terminates in the inlet orifice 11 of a draining-off unit 12 which is capable of dewatering the fibrous material while conveying it to the inlet nozzle 13 of the treatment enclosure 1 to be supplied.

Said draining-off unit 12 is capable of affording resistance to the operating pressure with complete safety. The outer cylindrical shell 14 of said unit contains a perforated cylinder 15 within which is mounted a screw 16 for conveying the fibrous material to the outlet nozzle 17 which is connected to the inlet of the treatment enclosure 1. The shaft of the screw conveyor 16 is driven in rotation by a reduction-gear motor set (not shown in the drawings). The assembly thus formed is placed in an inclined position with respect to the horizontal and a connector-pipe 18 for removal of the recovery liquid is provided at the lowermost extremity of the outer shell 12.

As can readily be understood, the inlet nozzle 11 opens into the space delimited by the perforated cylinder 15. Under these conditions, the mixture of liquid and of fibrous material is fed into this space under pressure and transferred by the screw conveyor 16 to the outlet nozzle. However, the fibrous material is subjected to a dewatering operation and the liquid thus removed flows out through the perforations of the cylinder 15 into the annular space formed around this latter before being finally discharged through the connector-pipe 18.

It is worthy of note that the screw conveyor 16 is rotatably mounted within the cylinder 15 with only a small clearance, thus causing the fibrous material to advance while carrying out constant cleaning of this cylindrical grid. It should also be observed that the screw conveyor is provided at the upper end thereof with a counter-turn 19 which is intended to prevent any danger of clogging in the vicinity of the outlet 17 of the draining-off unit. The mixture loaded with plant fibers to a maximum concentration of 6% and a minimum concentration of 2% is admitted at the inlet of the draining-off unit. After drip-draining within this unit, the concentration is increased at the outlet to about 18 or 20%.

In order to forestall any danger of admission of steam into the fluid-circuit, a minimum level of liquid is maintained within the draining-off unit 12 and also within an equilibrium drum 20 which communicates with this latter. To this end, provision is made for a level-adjusting device 27 which operates in dependence on two level detectors 27a and 27b. By means of fluid-circuits 28a and 29a, said level-adjusting device is capable of controlling two valves 28 and 29 respectively. The intended function of the valve 28 is to regulate the flow rate within a pipe 21 connected to the outlet of the drum 20 in order to recycle the treatment liquid which serves to transport and entrain the vegetable matter. The second valve 29 mentioned above is a fast-closing safety valve which is connected to the discharge pipe 10.

This device thus makes it possible to maintain constant the level of liquid contained in the lower portion of the draining-off unit, thus preventing the admission of steam into the fluid-circuit.

Finally, the installation in accordance with the invention comprises a treatment liquid recycling circuit which is employed in conjunction with the units described in the foregoing. This circuit comprises a device for sedimentation and removal of heavy particles in suspension in the treatment liquid. Said device consists of a centrifugal separator 23 within which the recovered liquid is conveyed through the pipe 21 which is connected to the equilibrium drum 20. After removal of the particles in suspension, the liquid is discharged from said separator through a pipe 22. In regard to the particles and impurities which have been removed (particles of sand, of silica and the like), said particles are recovered in the bottom hopper of the separator 23. This hopper communicates with a drum 24 which is intended to serve as a lock-chamber for the removal of impurities. The inlet and the outlet of said lock-chamber are closed by valves 25 and 26 respectively.

The liquid recovered within the pipe 22 is returned to the pipe 7 for diluting the impregnated materials upstream of the pump 6. Provision is also made, however, for a regulating device 34 which causes expansion of said liquid from the discharge pressure to the pressure of injection into the pulper 3. Said regulating device operates automatically by pressure measurement and gating of the stream of liquid by means of a valve 35.

However, the pipe 7 for supplying the dilution liquid is connected not only to the recycling pipe 22 but also to a pipe 36 for supplying make-up liquid. An automatic level-control device 37 ensures regulation of the admission of make-up liquid or of discharge of excess liquid in order to maintain a constant level within the pulper 3.

During operation of this installation, the pump 6 ensures a continuous supply of vegetable matter to the treatment enclosure 1, said vegetable matter being in suspension in a liquid mixture having a fiber concentration of approximately 18 to 20%. This supply is carried out at a relatively low pressure of the order of 4 to 8 bar; the treatment within the enclosure will take place at this pressure.

Since this treatment pressure is lower than that of the usual installations employed for continuous operation and fed by devices for the introduction of products in the dry form, the treatment time is longer but the overall cost of the installation is lower.

The installation in accordance with the invention permits the introduction of vegetable matter within a treatment enclosure under optimum conditions even in the case of annual plants. This is ensured with a high degree of efficiency and reliability since the operating speed of the pump can be controlled, thus making it possible to maintain a constant rate of flow within the discharge pipe.

It will be readily apparent, however, that this installation is not limited solely to the example described in the foregoing. Thus in the alternative embodiment shown in FIG. 2, the pulper unit 3 used for carrying out both impregnation and dilution of materials to be treated is replaced by two separate units 3a and 3b for carrying out these two functions respectively. In this case the impregnation unit 3a is placed upstream of the dilution unit 3b. The first unit may be constituted by a drum equipped with paddles rotatably mounted within a casing which contains a bath of treatment liquid. When discharged from this unit, the vegetable matter is therefore perfectly impregnated with this liquid. In regard to the dilution unit 3b, this unit consists of a tank within which is placed a simple rotary stirrer or impeller 4b. This tank is supplied with treatment liquid via the pipe 7 as in the previous embodiment. A discharge pipe 5b conveys the mixture thus obtained to the pump 6 (not shown) and the remainder of the installation is identical with the arrangements contemplated in the previous embodiment.

What is claimed is:

1. A method for supplying vegetable material into a treatment enclosure under pressure to subject the material in the enclosure to a reaction under pressure, said method comprising the steps of shredding the material into fragments; impregnating and diluting the material with a treating liquid prior to or simultaneously with said shredding step to produce a liquid-solid mixture; constantly feeding the thus-obtained mixture under pressure by a vortex pump into said treatment enclosure; measuring the flow rate of the mixture into the treatment enclosure; and varying the speed of the pump in dependence on the measured flow rate to keep the flow rate constant.

2. The method as defined in claim 1, wherein said reaction is either cooking or hydrolysis.

3. Apparatus for feeding vegetable material into a treatment enclosure under pressure to subject the material in the enclosure to a reaction under pressure, said apparatus comprising means for shredding the material into fragments and impregnating and diluting the material with a treating liquid so as to produce a liquid-solid mixture; a vortex pump, downstream of said means for feeding the mixture through a pipe under pressure into the treatment enclosure; a variable-speed motor for driving the pump; and means including a flow meter in said pipe and controlling the speed of said variable-speed motor in dependence on the flow rate measured by said flow meter so as to maintain the rate of flow through said pipe at a constant value.

4. Apparatus as defined in claim 3 and including a drain-off unit in said pipe downstream of said flow meter for separating part of the liquid from said liquid-solid mixture.

5. Apparatus as defined in claim 4, and including conduit means for feeding liquid separated from the liquid-solid mixture in said drain-off unit back to said means for producing a liquid-solid mixture, and means in said conduit means for separating particles in suspension in said liquid from the latter.

6. Apparatus as defined in claim 5, wherein said particle separation means comprises a centrifugal separator having a bottom discharge end and a lock chamber communicating with said discharge end for removal of impurities.

7. Apparatus as defined in claim 4, wherein said drain-off unit comprises an upwardly inclined first cylinder communicating at its lower end with said pipe, a second perforated cylinder of smaller diameter coaxially arranged in said first cylinder and communicating at an upper end thereof with said treatment enclosure, and a rotatable screw conveyor extending through said second cylinder.

8. Apparatus as defined in claim 7, wherein said screw conveyor has a counterscrew for preventing of packing the screw with conveyed material.

9. Apparatus as defined in claim 7, and including means for maintaining a minimum level of liquid within the lower portion of said drain-off unit and comprising means communicating with said first cylinder for detecting an upper and a lower level in said first cylinder, level adjusting means in circuit with said detecting means, a discharge conduit communicating with a lower portion of said first cylinder, a flow-regulating valve in said discharge conduit, a quick-closing valve in said pipe, said valves being controlled by said level adjusting means.

* * * * *